United States Patent
Senakiewich, II

(10) Patent No.: US 7,401,995 B2
(45) Date of Patent: Jul. 22, 2008

(54) CHANNEL CONNECTOR

(75) Inventor: Ronald C. Senakiewich, II, Royal Oak, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 0 days.

(21) Appl. No.: 11/094,892

(22) Filed: Mar. 31, 2005

(65) Prior Publication Data

US 2006/0222455 A1    Oct. 5, 2006

(51) Int. Cl.
   *F16B 2/18* (2006.01)

(52) U.S. Cl. .............. 403/374.4; 403/252; 403/258; 403/259; 403/348; 403/374.3; 411/551; 411/552; 410/104; 410/105

(58) Field of Classification Search .............. 403/374.3, 403/374.4, 374.5, 252, 253, 254, 255, 256, 403/257, 258, 259, 323, 348, 350, 351, 61, 403/110, 264; 24/135 N; 410/104, 105, 410/106, 110, 12; 248/499; 224/324; 411/84, 411/85, 551, 552; 114/218
See application file for complete search history.

(56) References Cited

U.S. PATENT DOCUMENTS

| | | | |
|---|---|---|---|
| 2,676,680 A * | 4/1954 | Kindorf | 411/84 |
| 2,688,504 A * | 9/1954 | Parker | 410/105 |
| 2,859,710 A * | 11/1958 | Elsner | 248/502 |
| 3,483,910 A * | 12/1969 | Van Huffel et al. | 411/112 |
| 4,239,139 A | 12/1980 | Bott | |
| 4,248,558 A | 2/1981 | Lechner | |
| 4,285,379 A * | 8/1981 | Kowalski | 411/85 |
| 4,410,298 A * | 10/1983 | Kowalski | 411/112 |
| 4,545,697 A * | 10/1985 | Verdenne et al. | 403/252 |
| 4,666,355 A * | 5/1987 | Stover | 411/85 |
| 4,784,552 A * | 11/1988 | Rebentisch | 411/85 |
| 4,969,784 A | 11/1990 | Yanke | |
| 5,370,488 A * | 12/1994 | Sykes | 411/551 |
| 5,388,744 A | 2/1995 | Glorio et al. | |
| 5,409,335 A | 4/1995 | Beck | |
| 5,738,471 A * | 4/1998 | Zentner et al. | 410/110 |
| 5,975,822 A * | 11/1999 | Ruff | 411/553 |
| 6,086,300 A * | 7/2000 | Frohlich | 411/84 |
| 6,585,465 B1 * | 7/2003 | Hammond et al. | 410/104 |
| 6,588,711 B2 * | 7/2003 | Onishi | 411/84 |
| 6,712,568 B2 * | 3/2004 | Snyder et al. | 410/104 |
| 6,769,847 B1 | 8/2004 | Heilmann | |
| 6,827,531 B2 * | 12/2004 | Womack et al. | 410/104 |
| 6,837,661 B2 * | 1/2005 | Schwarz et al. | 411/552 |
| 6,846,140 B2 * | 1/2005 | Anderson et al. | 410/104 |
| 7,044,701 B2 * | 5/2006 | Herb | 411/84 |
| 7,073,995 B2 * | 7/2006 | Herb | 411/85 |
| 2003/0156919 A1 * | 8/2003 | Schwarz et al. | 411/349 |
| 2004/0131439 A1 | 7/2004 | Womack et al. | |
| 2004/0131440 A1 | 7/2004 | Womack et al. | |
| 2004/0165947 A1 * | 8/2004 | Herb | 403/374.3 |

* cited by examiner

*Primary Examiner*—Michael P Ferguson
(74) *Attorney, Agent, or Firm*—Young Basile

(57) ABSTRACT

A channel connector comprises a main portion having a connecting portion, a clamping element having at least two opposite ends, and a threaded element threadably connecting the main portion to the clamping element. Each of the two opposite ends are spaced to interfere with walls of an interior portion of a channel during rotation of the clamping element in the interior portion of the channel.

18 Claims, 6 Drawing Sheets

CHANNEL CONNECTOR

BACKGROUND

Many conventional vehicles are utility focused in nature and are adapted to carry components, furniture, construction materials, and other such items. These vehicles are commonly equipped with a bed or interior space that is sufficiently large and suitably oriented to support its cargo. The demand for vehicles having this capability is ever increasing. For example, sales for pickup trucks and sport-utility vehicles have dramatically increased over the last few years.

BRIEF DESCRIPTION OF THE DRAWINGS

The present invention will now be described, by way of example, with reference to the accompanying drawings, in which.

DETAILED DESCRIPTION

Figure 1:
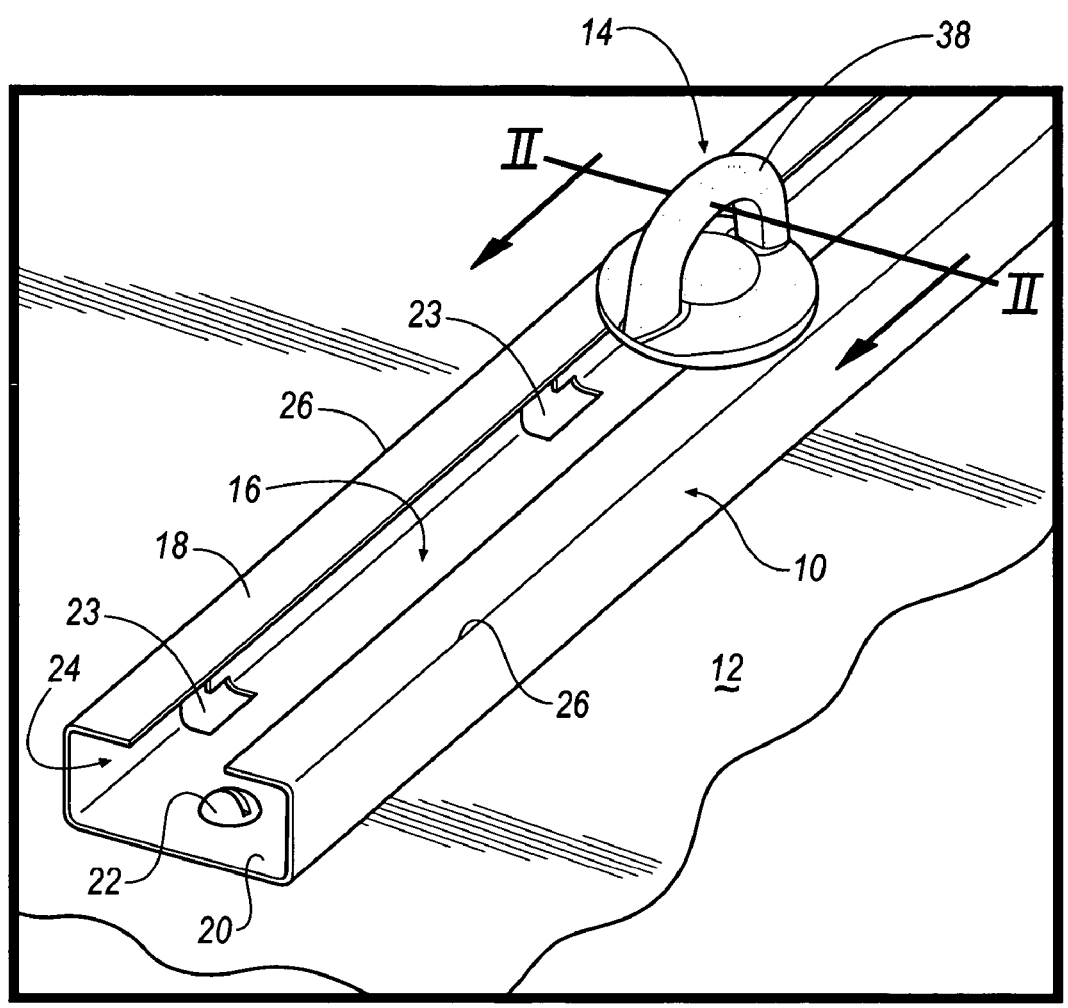
FIG. 1 is a perspective view of a channel connector assembly according to an embodiment of the present invention.

Referring now to FIG. 1, a channel 10 according to an embodiment of the invention is shown disposed on a vehicle 12. The channel 10 is connected to the vehicle 12 by fasteners, such as fasteners 22 (one shown in the Figure), which pass through apertures in the channel 10. The fasteners 22 may be any type of fastener such as screws, nuts, bolts or any other known means for attaching the channel 10 to the vehicle 12. Additionally, other apertures, such as apertures 23, may also be used to interconnect channel 10 with the vehicle 12. Also, although the channel 10 is shown positioned on a surface of the vehicle 12, it will be understood that the channel 10 may interrelate with the vehicle 12 in any known means such as where the upper surface 18 is flush with the surface of the vehicle 12. The channel 10 may also be disposed at any location in or on the vehicle.

The channel 10 generally includes a channel opening 16, an upper surface 18 and a lower surface 20. An interior portion 24 is defined by bottom, top and side walls of the channel 10. Likewise, corner regions 26 are defined by locations where upper surface 18 meets sidewalls of the channel 10. Although the channel 10 has been described as including sidewalls, corner portions, top and bottom surface, and other geometrical features, it will be understood by one skilled in the art that the channel 10 may employ other geometrical configurations.

The channel 10 includes a channel connector 14 connected to the channel 10. The channel connector 14 is fastened to the channel 10 by means that will be discussed in greater detail. The channel connector 14 includes a connecting portion 28 that has a loop 38 for attaching rope, tie down straps or other known fastening means. The loop 38 may be used for numerous reasons such as fastening items in the vehicle 12. Of course, one skilled in the art will readily recognize that other suitable fastening devices other than loop 38 may be employed.

Figure 2:
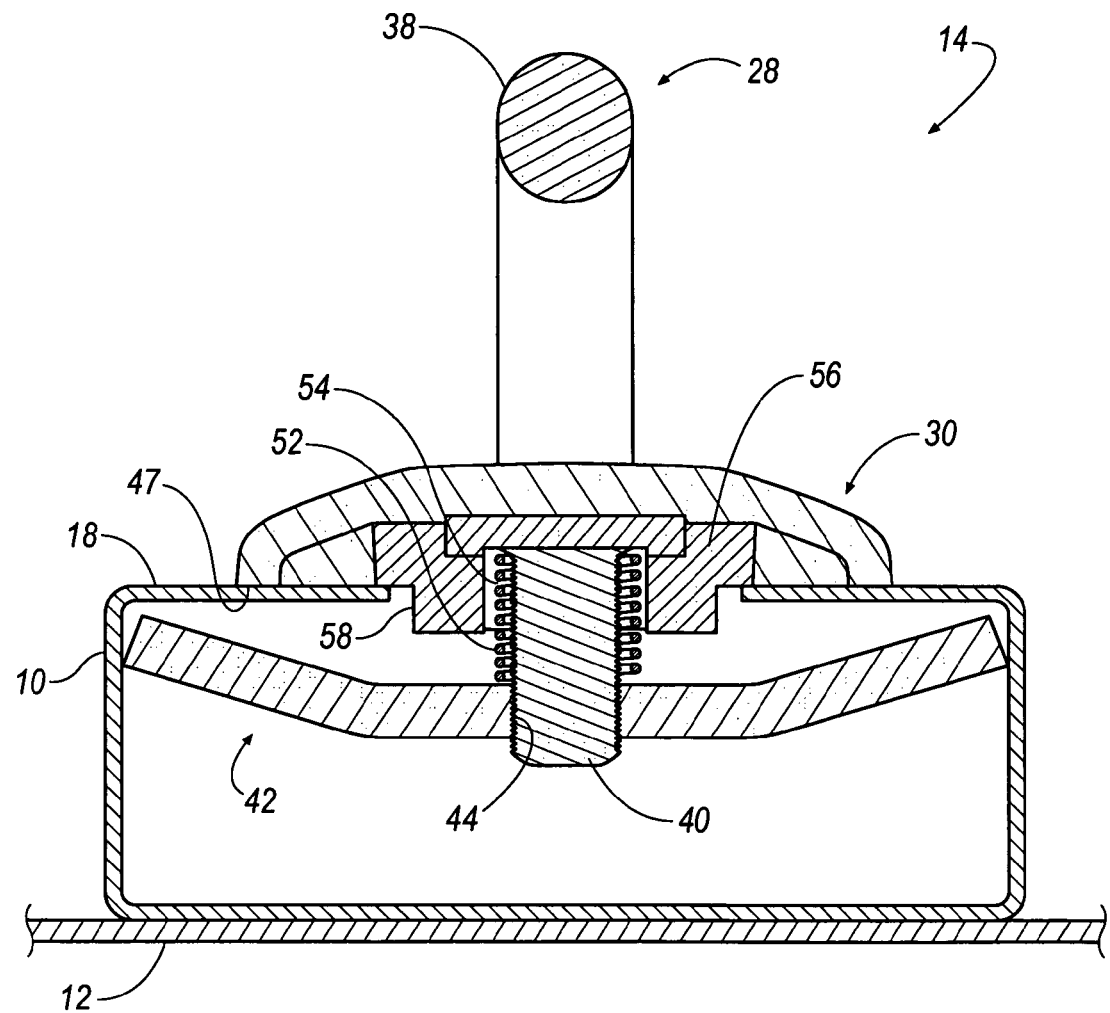
FIG. 2 is a cross-sectional view along II-II in FIG. 1 according to an embodiment of a channel connector according to the present invention.

Referring now to FIG. 2, an embodiment of the channel connector 14 is described in greater detail. In an embodiment, the channel connector 14 includes the connecting portion 28, a base 30, a threaded element 40 and a clamping element 42.

As discussed, the connecting portion 28 includes a loop 38 for connecting rope or other connecting means thereto. The connecting portion 28 may be covered with a rubber material or other suitable means to ease handling.

The base 30 supports the connecting portion 28 and generally includes bottom portion 47 and a locating boss 56. In one embodiment, the bottom portion 47 is adapted to abut the upper surface 18 of the channel 10. This abutting relationship helps secure the channel connector 14 to the channel 10 when the clamping element 42 (that will be discussed) is secured.

The locating boss 56 has an outside diameter 58 that is slightly smaller than a width 17 (see FIG. 6) of the channel opening 16. As will be discussed in greater detail, this relationship between the width 17 and outside diameter 58 helps to locate the locating boss 56 and therefore the channel connector 14 within the channel opening 16. The locating boss 56, in one embodiment, also has a recessed region 54 defined by an outer circumference of the threaded element 40 and an inside diameter of the locating boss 56.

The threaded element 40, in one embodiment, is a screw like member that is affixed to the base 30 and extends vertically away from the bottom portion 47. The threaded element 40 includes threads 44 that are adapted to thread to the clamping element 42. Thus, rotation of the threaded element 40 with respect to the clamping element 42 causes the clamping element 42 to move either upward or downward with respect to the Figure.

Figure 3:
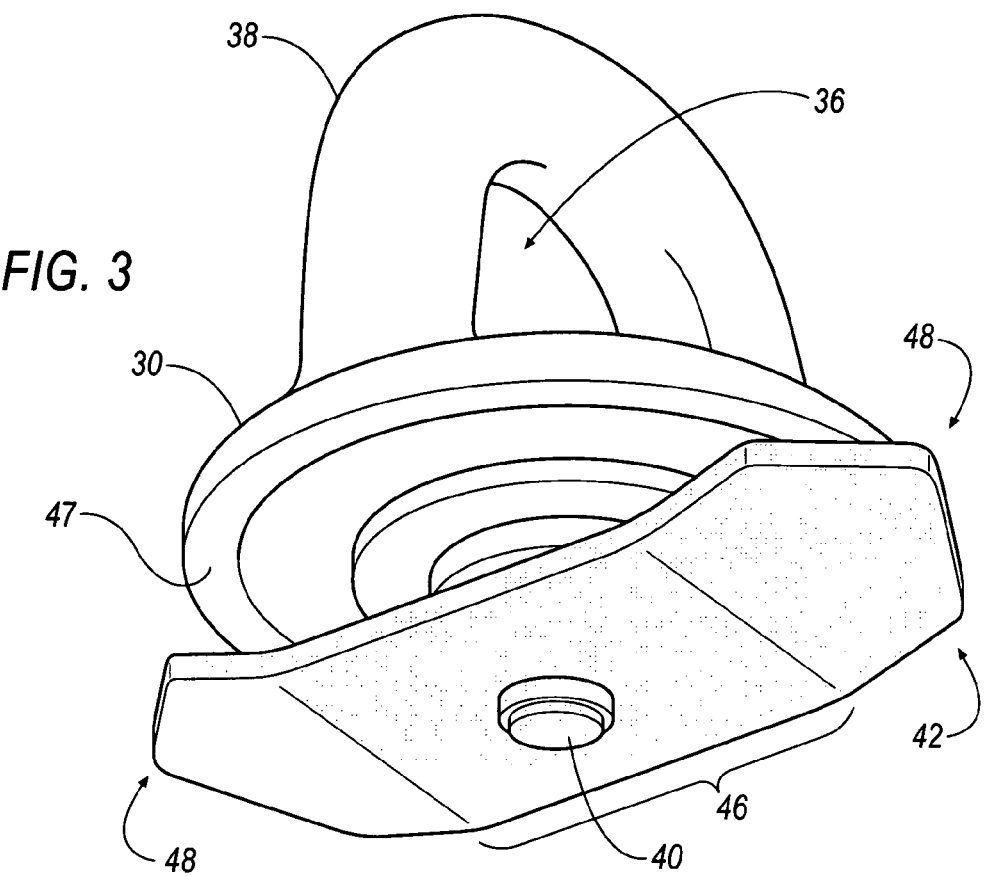
FIG. 3 is a perspective view of a channel connector according to an embodiment of the present invention.
Figure 4:
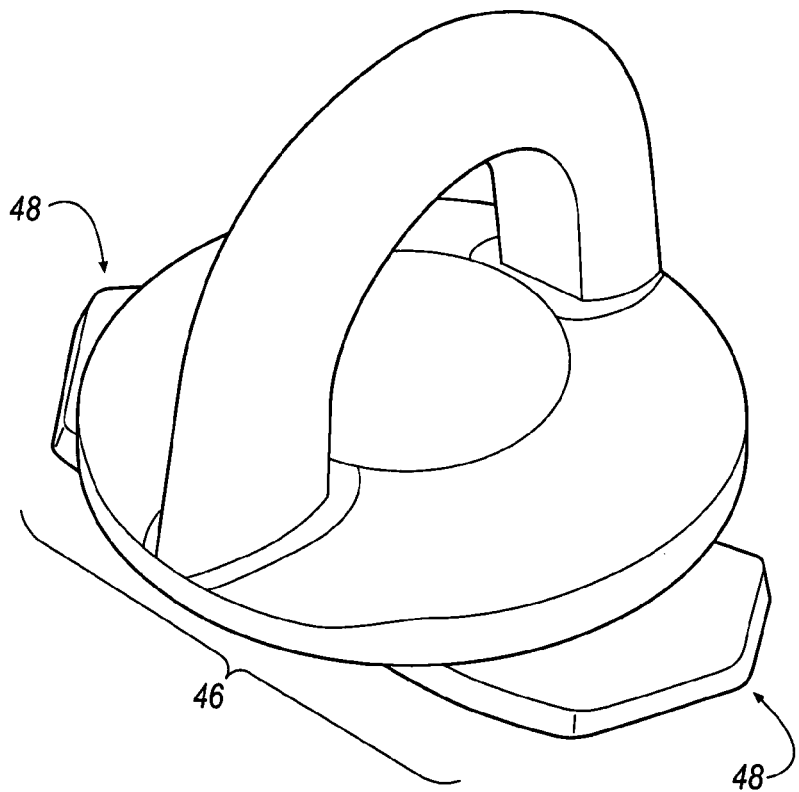
FIG. 4 is a perspective view of a channel connector according to an embodiment of the present invention.

As shown in FIGS. 3 and 4, the clamping element 42 generally includes a rectangular portion 46 that extends substantially horizontal with respect to the bottom portion 47. At outer ends of the clamping element 42 are located pointed portion 48. As generally shown in FIG. 3, pointed portions 48 are angled in an upward direction with respect to the Figure such that tips of the pointed portions 48 are, in an embodiment, the most upward located regions of the clamping element 42.

Referring again to FIG. 2, in an embodiment, a damping element, such as a spring 52, is positioned around and outside diameter of the threaded element 40 such that one end of the spring 52 is positioned within the recessed region 54 and an opposite end of the spring 52 abuts an upper surface of the clamping element 42. Frictional interaction between the spring 52, clamping element 42 and at the base 30 assists in assuring that the clamping element 42 rotates with the rotation of the base 30 for reasons that will be explained in greater detail hereinafter.

Figure 5:
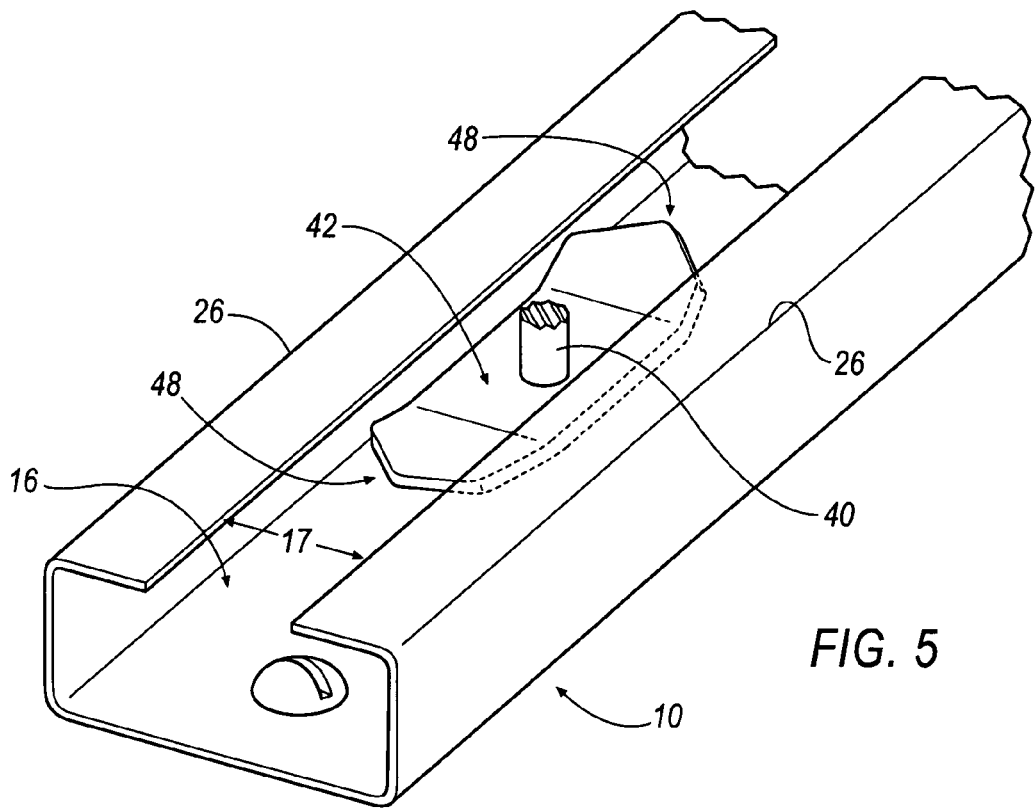
FIG. 5 is a perspective view of a channel connector assembly according to an embodiment of the present invention.

Referring now to FIGS. 5-8, the operation of an embodiment of the present invention will be shown and described. In operation, the channel connector 14 is first positioned in an operational relationship with the channel 10. To accomplish this, the clamping element 42 is first oriented in a lengthwise direction with respect to the channel opening 16. In this orientation, the clamping element 42 is passed downward through the channel opening 16 as shown in FIG. 5.

Figure 6:
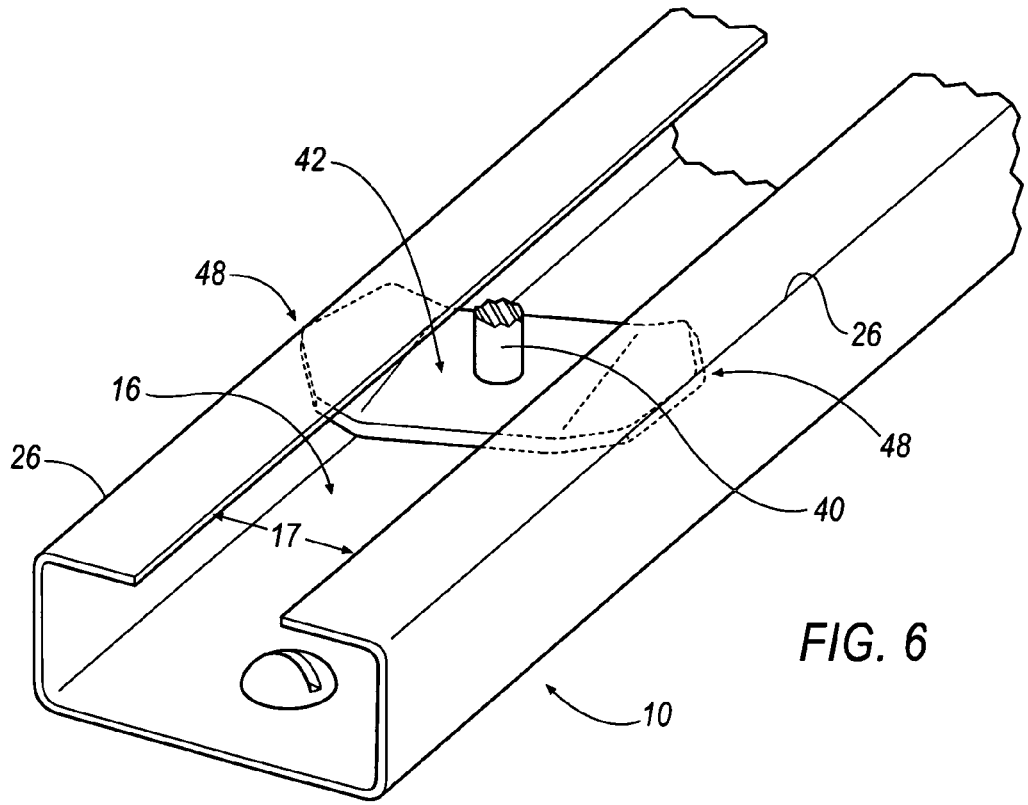
FIG. 6 is a perspective view of a channel connector assembly according to an embodiment of the present invention.

Next, the base 30 is rotated (such as by hand). As shown in FIG. 6, the interrelationship between the threads of the clamping element 42, the threaded element 40 and the base 30 cause the clamping element 42 to also rotate until pointed portions 48 abut the sidewalls of the channel 10. As shown in FIG. 2, the spring 52 provides additional frictional interrelationship between the base 30 and the clamping element 42 to assist the clamping element 42 in rotating with the base 30.

Figure 7:
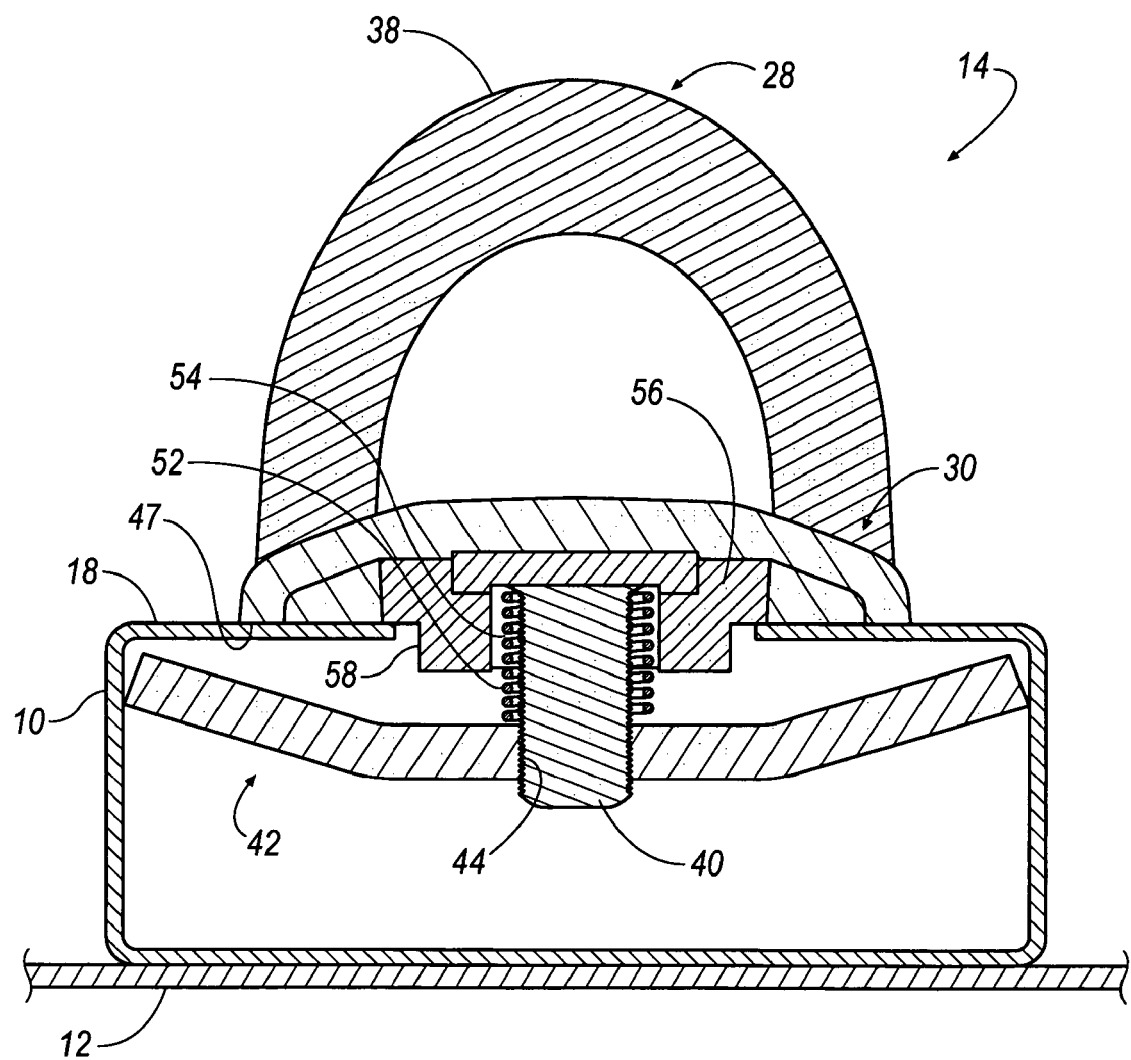
FIG. 7 is a perspective view of a channel connector assembly according to an embodiment of the present invention.
Figure 8:
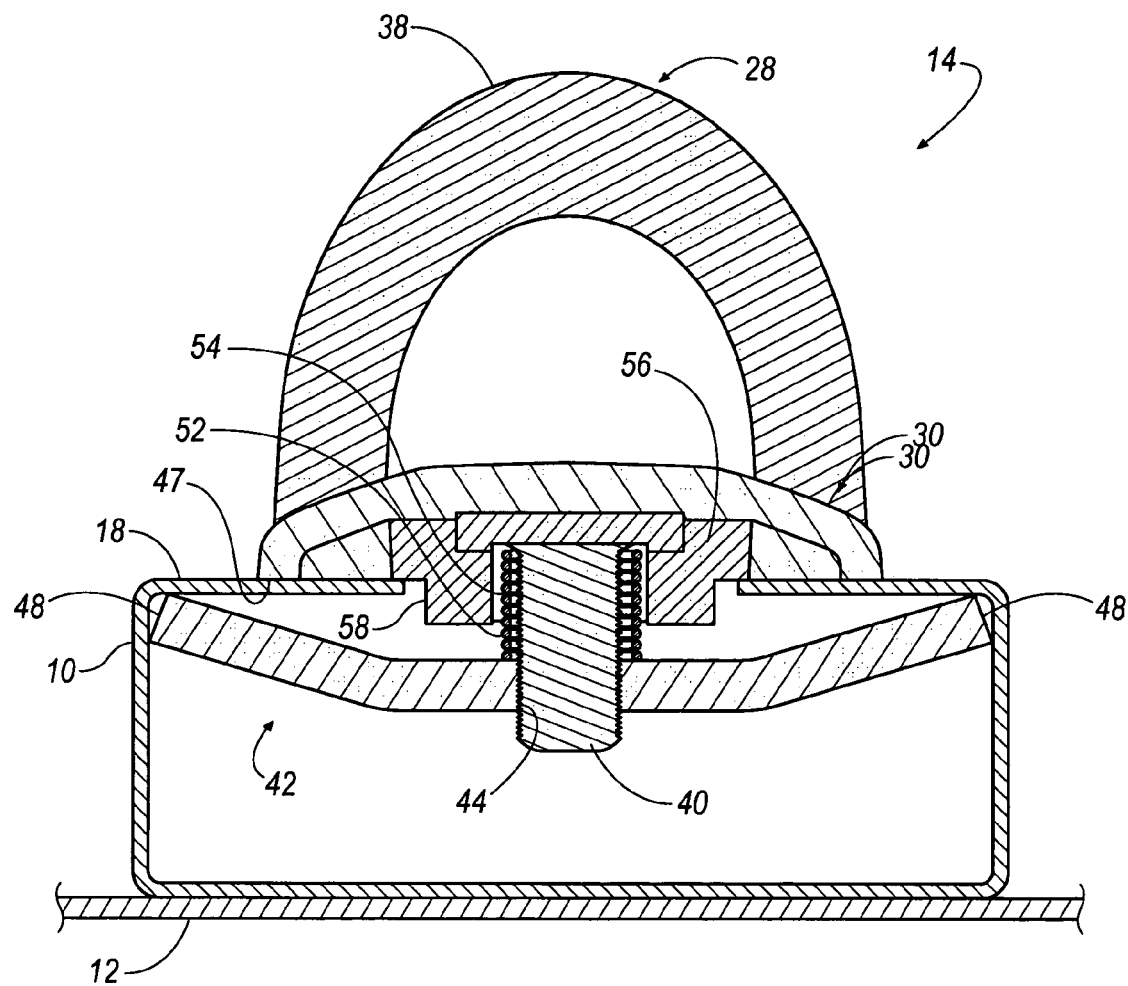
FIG. 8 is a perspective view of a channel connector assembly according to an embodiment of the present invention.

As shown in FIG. 7, once the pointed portions 48 abut against the walls of the channel 10, the clamping element 42 ceases rotational movement. Therefore, as shown in FIG. 8, continued rotation of the base 30 causes rotational movement of the threads of the threaded member 40 with the clamping element 42 to move the clamping element 42 upward with respect to the Figure until the pointed portions 48 abut against the inside surface of the upper surface 18. Continued rotation of the base 30 continues to clamp the pointed portions 48 of the clamping element 42 against the inside surface of the upper surface 18. The angled orientation of the pointed portions 48 allows the pointed portions 48 to flex slightly with respect to the rectangular portion 46 to create an elastic force, which increases the clamping force of the clamping element 42. Additionally, the reduced surface area of the pointed portions 48 provides increased clamping force against the upper surface 18.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A channel connector in combination with a channel having an interior portion defined at least in part by outer opposite side walls and a channel opening defined at least in part by inner opposite side walls, the channel connector comprising:
   a main portion having a connecting portion with a central axis of rotation;
   a clamping element having a central portion with two diametrically opposite ends located at points both radially furthest distant from the central axis and axially closest to the main portion, each of the two diametrically opposite ends having outer portions with an angled surface facing the main portion forming an obtuse angle between each end and the central portion;
   a threaded element extending along the central axis and threadably connecting the main portion to the clamping element, wherein the clamping element is rotatable about the central axis of the threaded element in response to rotation of the main portion, such that the clamping element is driven rotatably into engagement with the outer opposite walls of the channel and driven axially toward the main portion to clamp the channel interposed between the main portion and the clamping element with compressive force; and a damping member positioned between the main portion and the clamping element; wherein the damping member is adapted to bias the clamping element away from the main portion; wherein the damping member is adapted to provide an axial tension force between the main portion and the clamping element to provide rotational resistance therebetween.

2. The channel connector according to claim 1, further comprising:
   a locating boss disposed on a side of the main portion facing the clamping element;
   wherein the locating boss is disposed radially around the threaded element; and
   wherein the locating boss has a smaller outside diameter than an outside diameter of the main portion.

3. The channel connector according to claim 2, wherein the locating boss has a diameter adapted to fit within a channel opening of the channel to locate the channel connector in the channel with substantially no movement in a lateral direction with respect to a lengthwise orientation of the channel.

4. The channel connector according to claim 1, wherein the clamping element further comprises:
   a substantially rectangular planar portion at a radially central portion of the clamping element; and
   a substantially pointed planar portion at each of the two opposite ends;
   wherein each substantially pointed planar portion is angled with respect to the substantially rectangular planar portion toward the main portion.

5. The channel connector according to claim 1, wherein the damping member is a spring.

6. The channel connector according to claim 5, further comprising:
   a locating boss disposed on a side of the main portion facing the clamping element;
   wherein the locating boss is disposed radially around the threaded element;
   wherein the locating boss has a smaller outside diameter than an outside diameter of the main portion;
   wherein the locating boss has a recessed region disposed radially around the threaded element; and
   wherein an end of the spring proximate the main portion is disposed in the recessed region.

7. The channel connector according to claim 1, wherein:
   the damping member is a spring; and
   the spring abuts against the clamping element and the main portion to provide the rotational resistance between the main portion and the clamping element.

8. The channel connector of claim 1 further comprising:
   a clamped position with the clamping element clamped to the channel, such that rotation of the clamping element is initially interfered with by the two outer side walls of the interior portion of the channel in response to rotation of the main portion, and thereafter the clamping element is driven axially toward the main portion and into abutting relationship with the interior portion of the channel in response to continued rotation of the main portion.

9. A kit of components for a vehicle comprising:
   a channel having an interior portion defined at least in part by two opposite outer side walls and a channel opening defined at least in part by two opposite inner side walls;
   a channel connector comprising:
   a main portion having a connecting portion with a central axis of rotation;
   a clamping element having two diametrically opposite outermost ends located at points both radially furthest distant from the central axis and axially closest to the main portion, the ends spaced from one another a sufficient distance to engage the opposite outer side walls of the interior portion of the channel;
   a threaded element extending along the central axis and threadably connecting the main portion to the clamping element, wherein the two diametrically opposite outermost ends of the clamping element are rotatable about the central axis of the threaded element in response to rotation of the main portion and connected threaded element and the two opposite outer side walls of the interior portion of the channel obstruct rotation of the clamping element, such that the clamping element is driven rotatably into engagement with the outer opposite side walls of the channel and driven axially toward the main portion to clamp the channel interposed between the main portion and the clamping element with compressive force in response to rotation of the main portion; and a damping member positioned between the main portion and the clamping element; wherein the damping member is adapted to bias the clamping element away from the main portion; wherein the damping member is adapted to provide an axial tension force between the main portion and the clamping element to provide rotational resistance therebetween.

10. The kit according to claim 9, further comprising:

a locating boss disposed on a side of the main portion facing the clamping element;

wherein the locating boss is disposed radially around the threaded element; and wherein the locating boss has a smaller outside diameter than an outside diameter of the main portion.

11. The kit according to claim 10, wherein the locating boss has a diameter adapted to fit within the channel opening of the channel to locate the channel connector in the channel with substantially no movement in a lateral direction with respect to a lengthwise orientation of the channel.

12. The kit according to claim 9, wherein the clamping element further comprises:

a substantially rectangular planar portion at a radially central portion of the clamping element;

a substantially pointed planar portion at each of the two opposite ends; and wherein each substantially pointed planar portion is angled with respect to the substantially rectangular planar portion toward the main portion.

13. The kit according to claim 9, wherein the damping member is a spring.

14. The kit according to claim 9, wherein:

the damping member is a spring; and the spring abuts against the clamping element and the main portion to provide the rotational resistance between the main portion and the clamping element.

15. The kit of claim 9 further comprising:

means for driving the clamping element to a clamped position with respect to the channel, such that the clamping element is initially interfered with by the two outer side walls of the interior portion of the channel in response to rotation of the main portion, and thereafter the clamping element is driven axially toward the main portion and into abutting relationship with the interior portion of the channel in response to continued rotation of the main portion.

16. A kit of components for a vehicle comprising:

a channel having an interior portion defined at least in part by two opposite outer side walls and a channel opening defined at least in part by two opposite inner side walls;

a channel connector comprising:

a main portion having a connecting portion with a central axis of rotation;

a clamping element having two diametrically opposite outermost ends located at points both radially furthest distant from the central axis and axially closest to the main portion, a substantially rectangular portion at a radially central portion of the clamping element, a substantially pointed portion at each of the two opposite outermost ends, and each substantially pointed portion angled toward the main portion, wherein a distance between the pointed portions is larger than a width of the interior portion of the channel such that the two opposite outer side walls of the interior portion interfere with continued rotation of the clamping element about the central axis; and a threaded element threadably connecting the main portion to the clamping element, wherein each of the two diametrically opposite outermost ends are spaced and the two opposite outer side walls of the interior portion of the channel prevent complete rotation of the clamping element in the interior portion of the channel, the clamping element driven rotatably by the threaded element in response to rotation of the main portion until the clamping element engages the outer opposite side walls of the channel and driven axially toward the main portion to clamp the channel interposed between the main portion and the clamping element with compressive force; wherein the clamping element is biased away from the main portion by a damping member positioned therebetween; wherein the damping element provided an axial tension force between the main portion and the clamping element to provide rotational resistance therebetween.

17. A channel connector system for a vehicle comprising:

a channel having an interior portion defined at least in part by two outer side walls and an elongated channel opening into the interior portion defined at least in part by two inner side walls, the channel connectible to a vehicle body element; and a channel connector including:

a main portion with a central axis of rotation;

an elongated clamping element having two diametrically opposite ends located at points both radially furthest distant from the central axis and axially closest to the main portion, the ends spaced longitudinally from one another a sufficient distance to engage opposite outer side walls of the interior portion of the channel and a transverse width of the clamping element of sufficiently small dimension to pass though the elongated channel opening formed in the channel defined by the two inner side walls when a longitudinal axis of the clamping element is aligned with the elongated channel opening; and a threaded element extending along the central axis and threadably connecting the main portion to the clamping element, wherein the two diametrically opposite ends of the clamping element are rotatable about the central axis of the threaded element and the opposite outer side walls of the interior portion of the channel interfere with angular rotation of the clamping element, such that the clamping element is driven in rotation against the opposite outer side walls and driven axially toward the main portion to clamp the channel interposed between the main portion and the clamping element with compressive force in response to rotation of the main portion.

18. The channel connector system of claim 17, wherein the clamping element further comprises:

a central portion of the clamping element having a generally rectangular planar shape with two opposite ends; and an outermost portion of each of the two opposite ends having a generally pointed triangular planar shape canted slightly with respect to the central portion at an angle extending toward the main portion; wherein the clamping element is biased away from the main portion by a damping member positioned therebetween; wherein the damping element provided an axial tension force between the main portion and the clamping element to provide rotational resistance therebetween.

* * * * *